United States Patent [19]
Garrett

[11] 3,741,570
[45] June 26, 1973

[54] FLEXIBLE JOINT FOR SEWER PIPE

[76] Inventor: Ben B. Garrett, 13747 E. Philadelphia Street, Whittier, Calif. 90601

[22] Filed: Nov. 16, 1970

[21] Appl. No.: 89,845

[52] U.S. Cl............ 277/207, 277/DIG. 2, 285/231, 285/245
[51] Int. Cl.......................... F16j 15/10, F16j 15/32
[58] Field of Search............... 277/207, 207 A, 206, 277/206.1, 207; 285/231, 235, 240, 245, DIG. 19

[56] References Cited
UNITED STATES PATENTS

| | | | |
|---|---|---|---|
| 2,516,743 | 7/1950 | Allin | 285/DIG. 19 |
| 3,186,739 | 6/1965 | Mahoff et al. | 285/231 |
| 2,953,398 | 9/1960 | Haugen et al. | 277/207 A |
| 2,966,539 | 12/1960 | Sears et al. | 277/207 A |
| 2,991,092 | 7/1961 | MacKay | 277/207 A |

FOREIGN PATENTS OR APPLICATIONS

| | | | |
|---|---|---|---|
| 923,129 | 4/1963 | Great Britain | 285/019 |
| 190,550 | 2/1963 | Sweden | 277/DIG. 2 |

Primary Examiner—George E. Lowrance
Assistant Examiner—Robert I. Smith
Attorney—Whann & McManigal

[57] ABSTRACT

A flexible joint for sewer pipe, particularly clay pipe, for connecting a bell pipe section and a spigot pipe section, in which the bell section has an internal circumferential rib forming a support for the spigot end and upon which it may fulcrum during relative tilting movements of the sections. The inner surface of the bell is relieved on one side of the supporting rib, and on the other side is formed with a groove for a sealing gasket of resilient deformable material, such as rubber, the groove having a peripheral space or cavity into which the gasket material can flow or expand under operating applied compression forces.

8 Claims, 4 Drawing Figures

PATENTED JUN 26 1973　　　　　　　　　　　　　　　3,741,570
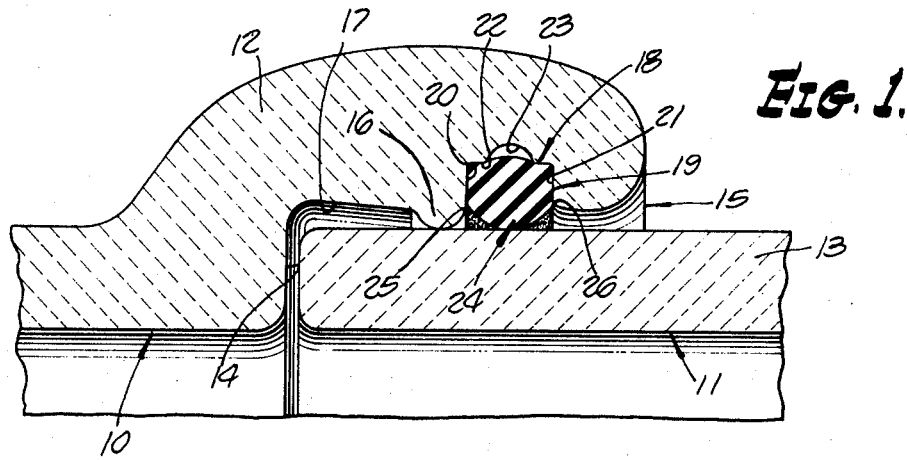
FIG. 1.
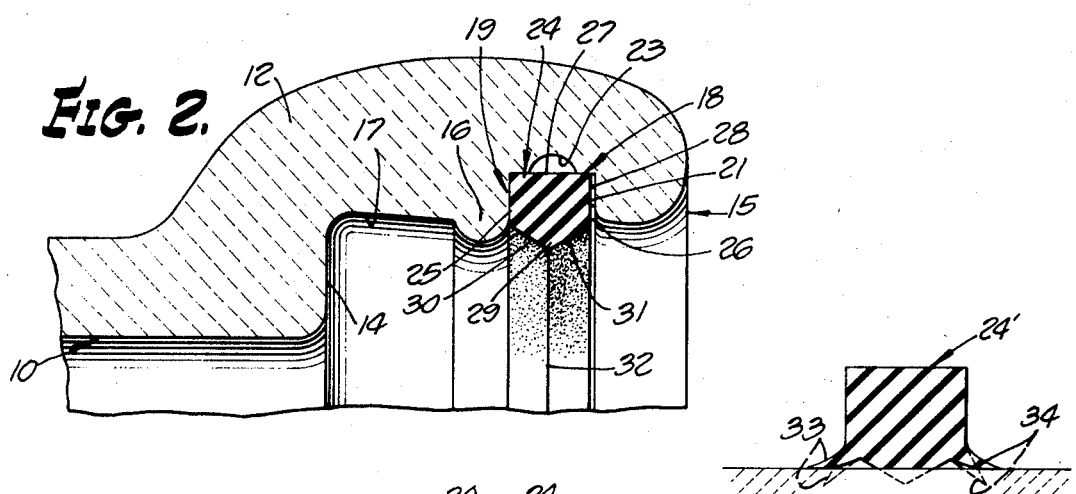
FIG. 2.
FIG. 4.
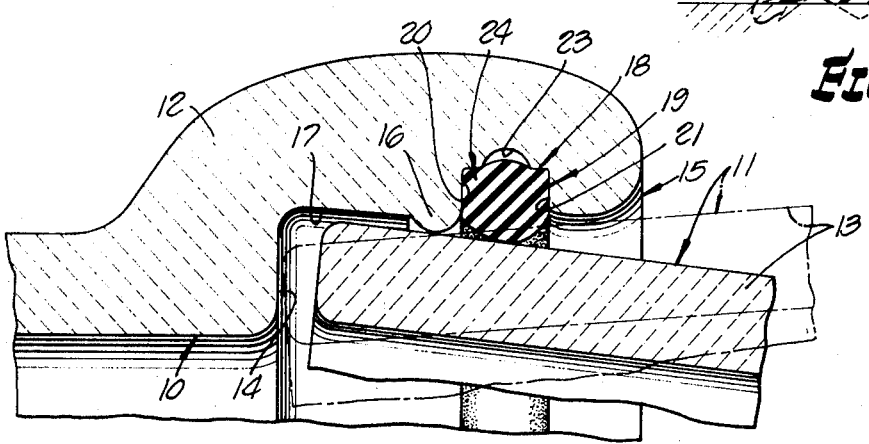
FIG. 3.
BEN B. GARRETT
INVENTOR
WHANN & McMANIGAL
Attorneys for Applicant
BY

FLEXIBLE JOINT FOR SEWER PIPE

BACKGROUND OF THE INVENTION

The present invention relates to pipe joints.

Heretofore, it has been the prevailing practice to construct sewer pipe bell sections and spigot sections with generally straight axially extending interfitting complementary joint forming surfaces, and to have used sealing gaskets of plastic, rubber or other suitable material, these gaskets having a variety of shapes to ostensibly improve the sealing function or for some other desired reason.

As exemplary of the conventionally known structures, reference is made to U. S. Pat. No. 3,219,354 which shows a pipe joint for connecting male and female components, wherein an interposed ring gasket is compressed between the connected ends to provide the joint seal.

While a joint as disclosed in the above patent is adapted for use with pipe sections formed of hard materials such as in steel, the use of such a joint structure with clay pipe presents problems which are objectionable and undesirable. Clay pipe bells are relatively weak and can break easily under internal leverage stresses such as might be produced by sagging deflection or misalignment of the connected pipe sections. The known joint arrangements, which are substantially rigid and have little or no flexibility, work satisfactorily when installed in the earth or ground which is firm and unyielding, but in most sewer line installations, such conditions do not exist for any considerable length of time.

It is the customary procedure in laying sewer pipes to dig the pipe ditches slightly below the grade line and then backfill with loose soil and compact it for receiving the sewer pipe thereon. However, such compaction quite often is insufficient to make the supporting ground unyielding. After a time, the yielding and settling of the soil under the pipes allows the joints to sag to such an extent that leverage forces are created within the interior of the bell sufficient to cause breakage of the frangible clay material. Also, when it is endeavored lay the pipe along a curved course, the fact that the joints according to the conventional procedure are relatively unyielding causes bell breakage.

In the use of hard materials in the pipe, and particularly where these materials, as in the case of metal and asbestos-cement sewer pipe, which can be finished to relatively close tolerances, the ring seals of the relatively rigid joint operate satisfactorily. However, problems do arise with pipes made of clay materials. These pipes, when fired, may vary as much as one-fourth inch in diameter form one kiln to another, depending upon the heat which reaches the pipe. In order to assure a good seal which will accommodate under the various pipe diameters, it becomes necessary to subject the ring seals to relatively high pressures. In doing this, it is a feature of the present invention to overcome the problems of the known arrangements by providing a peripheral space or cavity in the gasket supporting groove in order that the gasket material, particularly in the case of rubber, will have a place to expand or flow when subjected to these higher pressures. This feature is particularly desirable where the joint is of a flexible character rather than a rigid character.

SUMMARY OF THE INVENTION

The present invention relates generally to pipe joints, and is more particularly concerned with improvements in bell and spigot connection joints for clay sewer pipe sections.

Having in mind the limitations of the heretofore noted prior known structures, it is an object of the present invention to provide an improved connection for sewer pipe bell and spigot pipe sections, which is simple and economical of manufacture, and wherein the coupled sections are so constructed as to enable relative pivoting or tilting of the sections in the joint and thus avoid the setting up of stresses which could impair the joint or rupture the pipe sections.

A further object is to provide a sewer pipe having a unique bell construction with an internal rib which will provide a support for the connected spigot pipe section as well as a fulcrum upon which it can relatively tilt when sagging or deflection occurs at the joint between the connected pipe sections.

Another object is to provide a flexible joint for sewer pipes, which includes bearing surfaces which form pivotal supports at the joined ends, and an adjacent groove for supporting a deformable resilient sealing gasket of unique construction, and wherein a space or cavity is provided for the expansion or flow of the gasket material when it is subjected to operating compression forces.

Still another object is to provide a flexible joint for sewer pipes, which utilizes a sealing gasket of unique cross section configuration, and which is arranged with edge flap portions for effectively sealing the joined pipe sections against leakage under internal fluid pressure conditions.

It is also an object to provide as an article of manufacture, a sewer pipe section having an improved and unique bell structure.

Further objects of the invention will be brought out in the following part of the specification, wherein detailed description is for the purpose of fully disclosing the invention without placing limitations thereon.

BRIEF DESCRIPTION OF THE DRAWINGS

Referring to the accompanying drawings, which are for illustrative purposes only:

FIG. 1 is a fragmentary sectional view of a pipe joint according to the present invention, the connected pipe sections being axially aligned;

FIG. 2 is a fragmentary sectional view of a female pipe section showing the details of construction of the bell end of the pipe section, and the associated sealing gasket in its normal relaxed condition;

FIG. 3 is a view similar to FIG. 1, but illustrating the tilting action of the connected spigot end within the bell end of the female component; and FIG. 4 is a fragmentary view diagrammatically illustrating a modified gasket construction and its operative sealing relationship with respect to an associated spigot pipe section.

DESCRIPTION OF THE SEVERAL EMBODIMENTS

Referring more specifically to the drawings, for illustrative purposes, the present invention is shown as being embodied in a pipe joint for interconnecting female and male pipe components 10 and 11, the female component being formed at its connection end with an enlarged bell end portion 12, while the male component constitutes a spigot with a straight smooth connection end portion 13. While the joint of the present invention may be utilized with pipe sections constructed of various types of material, the unique features of the joint of the present invention are in particular applicable to pipes constructed from a clay material.

The bell end portion 12 has a generally circumferentially extending inner wall surface, and at the inner end of the bell, the interior is arranged to provide an annular radial abutment shoulder 14 which is in right-angled relation to the pipe axis. Between this abutment shoulder and the entrance mouth 15 of the bell, a portion of the inner wall is shaped to provide a circumferentially extending inwardly projecting rib 16 having its innermost edge rounded, and providing a support for the inserted male component 11 as well as a fulcrum upon which the connected pipe may be tilted. The inner diameter of this rib should be such as to permit the male component to be loosely inserted into the joint connection and to permit the tilting without binding.

In order to enable the relative tilting of the connected pipe components, the intervening wall between the abutment shoulder 14 and the rib 16 is relieved, and for this purpose is fabricated with a frusto-conical circumferentially extending wall surface 17 which tapers towards the rib 16. It will also be noted that the inner diameter of the bell at the mouth 15 is sufficiently greater than the outer diameter of the associated connection end portion 13 so as not to interfere with the tilting movements on the fulcrum rib 16.

The seal assembly, as generally indicated at 18, is positioned on the opposite side of the rib 16 and comprises a radially inwardly opening circumferentially extending groove 19 having side walls 20 and 21, and bottom wall 22 in right-angled relation. The bottom wall is centrally provided with a circumferentially extending outwardly projecting portion which forms a peripheral cavity 23 in the groove bottom.

The sealing member consists of a ring gasket, as generally indicated at 24, of a suitable resilient deformable material such as rubber.

The ring gasket is shaped to conform to the groove 19 and for this purpose is provided with side walls 25 and 26, and outer wall 27, which are in right-angled relation and complementary to the groove walls. As shown in FIG. 2, it will be observed that the gasket is not sufficiently wide to completely fill the groove, and that a lateral space 28 remains between the adjacent gasket wall 26 and groove wall 21, when the gasket is in relaxed condition. This space provides initial flow space for the material of the gasket when it is in connected compressed condition with the associated male component of the joint. This condition is shown in FIG. 1, and it will be noted that in addition to the gasket material filling the space 28, it may also bulge slightly into the peripheral cavity 23. The gasket 24 at its inner periphery is provided with a protrusion 29 which is bounded by inwardly converging wall portion 30 and 31 to a juncture line 32. As shown in FIG. 1, when the pipe sections are in connected relation, the area at the junction line 32 is flattened against the outer surface of the component to provide sealed engagement therewith.

As shown in FIG. 3, the connected pipe sections are flexibly connected by means of the unique joint as described above, wherein the rib 16 not only provides a solid support for the male component, which normally relieves the sealing gasket from high compressive pressures, and leaves the gasket to perform its sealing function by virtue of the normally applied compressive forces thereon. At the same time, the rib 16 provides a fulcrum surface upon which the male component may be tilted as indicated in full lines and phantom lines. Further, in view of the relieved area at the frusto-conical portion 17 and the loose fitting mouth portion 10 of the bell, this tilting movement may take place freely without setting up leverage stresses which could fracture or otherwise damage the bell portion of the female component.

Referring to FIG. 4, there is shown a modified gasket structure 24' in which the inner edge margins of the gasket are constructed with tapered edge flaps 33 and 34 which are normally in slightly inwardly diverging relation as indicated in dotted lines, but which upon connection of the pipe section will be distorted into overlying relation with the outer surface of the male component. With the pipe sections in connected relation, these flaps will provide increased sealing pressure against the male component due to increased fluid pressures acting thereon. Thus, the flap 33 will respond to internal pressure within the connected pipe sections, while the flap 34 will respond to fluid pressures external to the joined pipe sections.

From the foregoing description and drawings, it will be clearly evident that the foregoing objects and features of the invention will be accomplished.

Various modifications may suggest themselves to those skilled in the art without departing from the spirit of my invention, and, hence, I do not wish to be restricted to the specific forms shown or uses mentioned, except to the extent indicated in the appended claims.

I claim:

1. A pipe joint for connecting the bell end of one pipe section and an inserted spigot end of an adjoining pipe section, comprising:
   a. an annular radial abutment flange axially inwardly spaced from the mouth of the bell providing a stop for engaging and positioning the end of the inserted spigot;
   b. an internal circumferential rib in the bell positioned between said flange and the bell mouth, said rib having a rounded inner edge adapted to loosely surround the inserted spigot end and form a fulcrum support therefor, the inner surface of said bell between said abutment flange and said rib, and the inner surface at the bell mouth being radially outwardly relieved to permit tilting movement of the inserted spigot end portion on the fulcrum support;
   c. a circumferentially extending radially inwardly opening groove in the inner surface of said bell on the outer side of said rib; and
   d. an annular gasket of resilient deformable material seated in said groove and being so dimensioned as to have compressed sealing engagement with the outer facing surface of the inserted spigot end during said tilted movements.

2. A pipe joint according to claim 1, wherein said groove includes a space for the expansion of said gasket under compression forces in its operating sealing engagement with said spigot end.

3. A pipe joint according to claim 1, wherein said groove has a radially outer wall portion, an outer end wall portion and an inner end wall portion, and said gasket has a radially inwardly extending protuberance projecting beyond said groove into engagement with the coupled spigot end.

4. A pipe joint according to claim 3, wherein said protuberance in a relaxed condition of said gasket has an inner diameter less than the outer diameter of the coupled spigot end.

5. A pipe joint according to claim 3, wherein the radially outer wall of said groove has a peripheral cavity for the expansion of the gasket material under compression forces.

6. A pipe joint according to claim 3, wherein said gasket has inwardly extending edge flap extensions positioned on opposite sides of said protuberance.

7. A pipe joint according to claim 6, wherein said flap extensions diverge inwardly and are tapered towards their free edges.

8. As an article of manufacture, a sewer pipe having a bell connection end, the improvement comprising:

a. an internal generally cylindrical surface in said bell end with an annular radial abutment shoulder axially inwardly spaced from the mouth of the bell;

b. an internal circumferential rib in the bell axially positioned between said shoulder and the bell mouth, said rib having a rounded inner edge providing a bore opening of a diameter greater than the inner diameter of said annular shoulder;

c. radially outwardly relieved cylindrical wall portions in said bell extending from said abutment shoulder to said rib and from said rib to the bell mouth; and d. a circumferentially extending radially inwardly opening groove on the bell mouth side of said rib, said groove having side and bottom walls in right-angled relation, and said bottom wall having a radially outwardly projecting portion formed to provide a circumferentially extending cavity.

* * * * *